(No Model.)  G. B. CASADAY.  2 Sheets—Sheet 1.
PLOW JOINTER.

No. 338,481. Patented Mar. 23, 1886.

Witnesses.
Chas. R. Burr.
J. B. Church.

Inventor.
George Burdet Casaday
by Franck D. Johns
his Attorney.

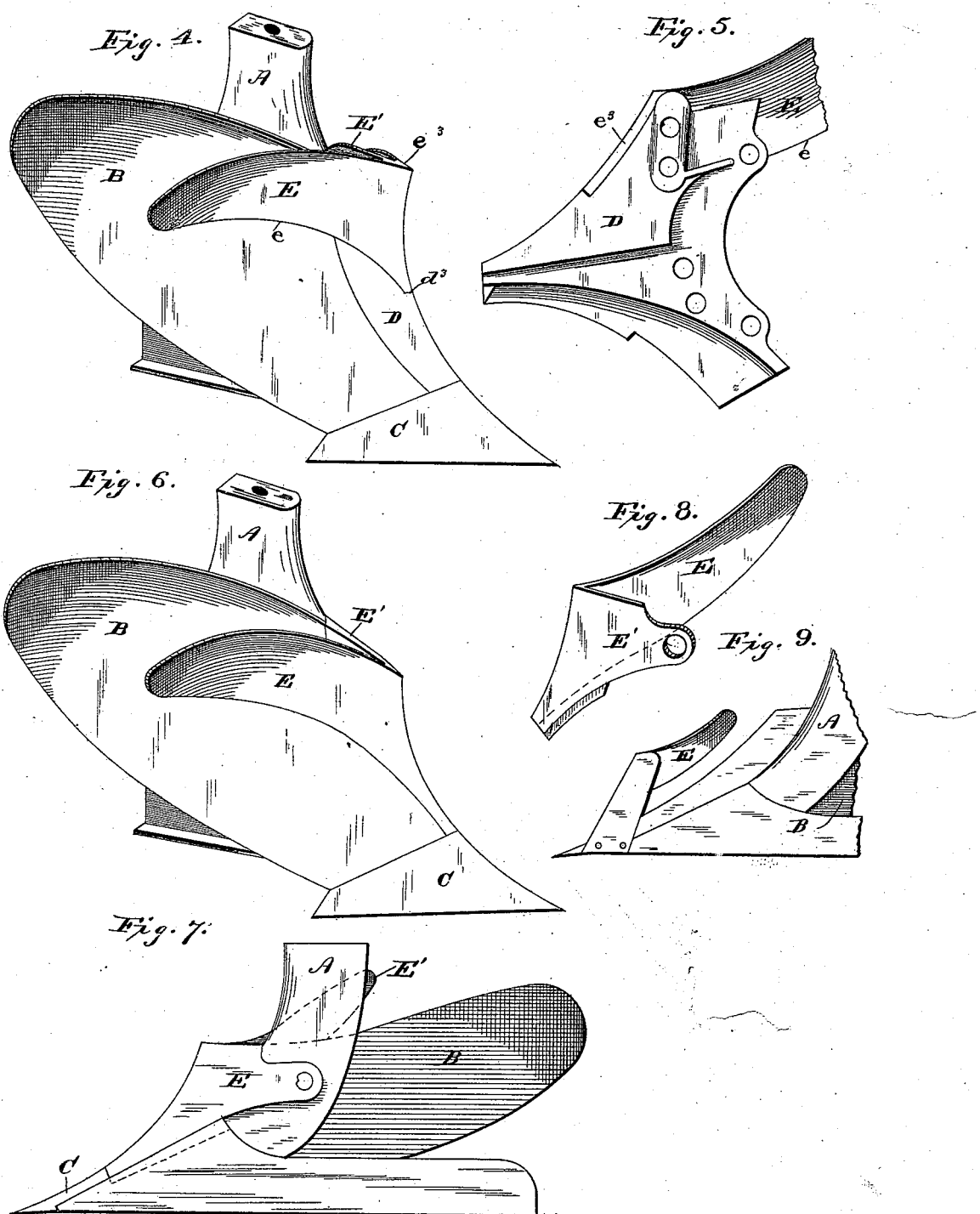

UNITED STATES PATENT OFFICE.

GEORGE BURDET CASADAY, OF HUDSON, LA PORTE COUNTY, INDIANA.

PLOW-JOINTER.

SPECIFICATION forming part of Letters Patent No. 338,481, dated March 23, 1886.

Application filed October 27, 1885. Serial No. 181,097. (No model.)

*To all whom it may concern:*

Be it known that I, GEORGE BURDET CASADAY, a citizen of the United States, residing in Hudson township, in the county of La Porte and State of Indiana, have invented certain new and useful Improvements in Plow-Jointers; and I do hereby declare the following to be a full, clear, and exact description of the invention, such as will enable others skilled in the art to which it appertains to make and use the same.

My invention relates to improvements in plow-jointers which are secured directly to the wearing-face of a plow, and is particularly adapted to be used with a plow having a removable and reversible shin or cutter.

It consists in certain novel construction and arrangement of the various parts of the plow and jointer, and in the manner of securing the jointer to the plow, all of which I will now proceed to point out and describe, reference being had to the accompanying drawings, in which—

Figure 1:
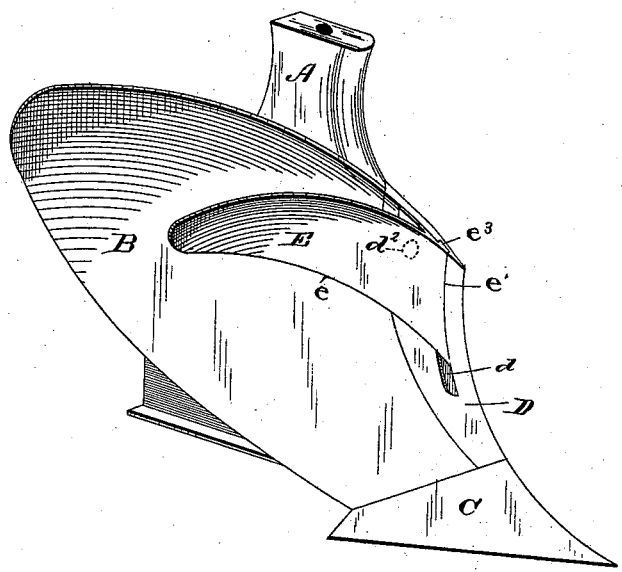
Figure 2:
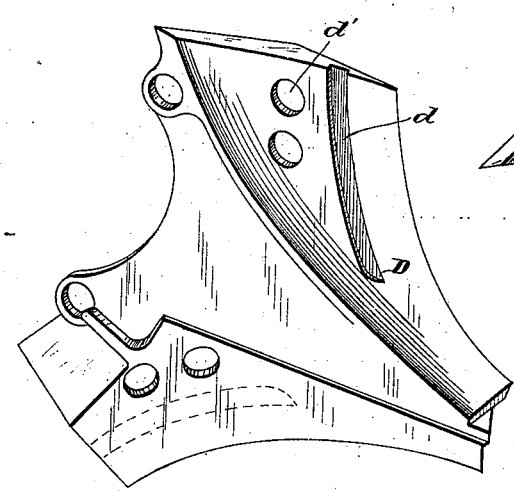
Figure 3:
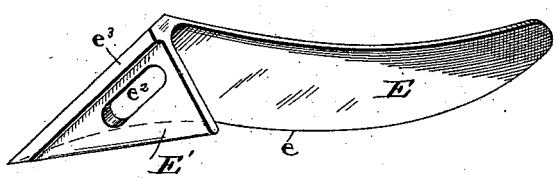

Figure 1 is a perspective of a plow provided with my improvements. Fig. 2 is a perspective of the removable and reversible cutter, with the jointer removed; Fig. 3, a perspective of the under side of the jointer. Fig. 4 is a perspective of a plow in which the jointer is secured directly to the cutting-edge of the shin or cutter. Fig. 5 is a detail; Fig. 6, a perspective of a plow embodying a modification of my invention. Fig. 7 is an elevation of the land side of the plow shown in Fig. 6. Fig. 8 is a perspective of a jointer used with the plows shown in Figs. 6 and 7. Fig. 9 is a land side elevation of a further modification of my invention.

Referring to said drawings, A is the standard of a plow; B, the mold-board; C, a combined wing and point.

D is a removable and reversible shin or cutter, having two opposite wearing-faces and cutting-edges, the wearing-face in use forming a continuation of the mold-board, and its cutting-edge forming the land-side cutting-edge of the plow.

$d$ $d$ are grooves in the wearing-faces of the removable and reversible cutter at one side of and about parallel with the cutting-edges.

$d'$ $d'$ are bolt-holes in the upper part of the wearing-faces of the cutter.

E is a jointer shaped somewhat like the mold-board of a plow and having a lower cutting-edge, $e$, and land-side edge $e'$.

E' is a flange on the under side of the jointer. $e^2$ is a slot in said flange. $e^3$ is a shoulder on the flange E' just under the land-side edge of the jointer. When the jointer is attached to the plow the shoulder $e^3$ rests in the groove $d$ on the working-face of the cutter, and is secured in place by a bolt, $d^2$, passing through the bolt-hole $d'$ and slot $e^2$, said bolt being shown in dotted lines, Fig. 1, the land-side edge of the jointer resting against the land side of the groove $d$, the outer face of the jointer being flush with that portion of the working-face of the cutter between the jointer and cutting edge, thus presenting no projecting edges or points against which roots, dirt, &c., could accumulate, and rendering the plow less liable to clog, the lower cutting-edge, $e$, of said jointer projecting over the mold-board at an incline to the same, and forming a continuous cutting-edge from point of plow to heel of jointer. The groove $d$ is sufficiently longer than the flange E' and shoulder $e^3$ to permit the jointer to be adjusted up or down to suit the different depths of plowing. This adjustment can be made without removing the jointer from the plow, for when the nut on the bolt $d^2$ is loosened the slot $e^2$ is long enough to permit the jointer to be moved up or down the desired distance.

In the construction shown in Fig. 4 the cutting-edge of the cutter is formed with a shoulder, $d^3$, the flange on the jointer being set back from the edge, forming a long shoulder, $e^3$. When adjusted, this shoulder rests on the upper part of the edge of the cutter, the flange E' resting on the wearing-face of said cutter and the lower point of the jointer resting against the shoulder $d^3$, the land-side edge of the cutter forming a continuation of the cutting-edge of said cutter.

Figs. 6, 7, and 8 show a modification of my invention, in which the jointer is made to take the place of the removable and reversible shin or cutter. In this modification the mold-board is continued to the land-side edge of the plow, and the flange E' overlaps the edge of said mold-board and forms a part of the land side of the plow, the lower part of the flange E' extending under the upper edge of the land side and is secured to the standard by a suitable bolt. In this construction the lower point of the jointer extends down to the top of the combined wing and point, different sizes of jointers being used in the modification to suit the depth of plowing.

In Fig. 9 I show a further modification of my invention, in which the flange E' is secured to the land side of the plow, the jointer being elevated above the land side cutting-edge of said plow.

The advantages of my invention are that by attaching the jointer directly to the wearing-face of the plow I do away with the bracket or jointer-standard, thus greatly simplifying and strengthening the construction of the plow and at the same time produce a jointer which is effective in use, and has no projecting edges or points between which and the plow roots, stubble, &c., can collect, thus rendering the plow less liable to clog.

In operation the jointer cuts off the grass, stubble, &c., on top of the furrow-slice and throws the same in the bottom of the previous furrow in front of the mold-board. As the mold-board turns the furrow-slice the grass, &c., is covered to the full depth of plowing, thus preventing the same from growing up between the furrows.

A further advantage of my invention is that the jointer enters the ground after it has been loosened, and will work much easier than jointers placed in front of the plow.

Having thus fully described my invention, I claim as new and desire to secure by Letters Patent—

1. In a plow, a shin or cutter having a groove in its working-face about parallel with its cutting-edge, in combination with a jointer having on its under side a flange provided with a shoulder adapted to be secured in the groove on the cutter and adjustable in said groove, substantially as shown and described.

2. In a plow, a shin or cutter, in combination with a jointer secured directly to the working-face of the cutter, the lower edge of the jointer forming a continuous cutting-edge from the point of the plow to the heel of the jointer, substantially as shown and described.

In testimony whereof I affix my signature in presence of two witnesses.

GEORGE BURDET CASADAY.

Witnesses:
 JOHN H. WADE,
 E. H. HARRIS.